United States Patent [19]
Mott

[11] Patent Number: 4,483,358
[45] Date of Patent: Nov. 20, 1984

[54] ADJUSTABLY TILTABLE PNEUMATIC DEVICE

[75] Inventor: Richard C. Mott, Harwood Heights, Ill.

[73] Assignee: Honeywell Inc., Minneapolis, Minn.

[21] Appl. No.: 175,156

[22] Filed: Aug. 4, 1980

[51] Int. Cl.³ .............................................. G05D 16/00
[52] U.S. Cl. ........................................ 137/39; 137/82
[58] Field of Search ....................... 137/82, 85, 38, 39; 251/61.1

[56] References Cited

U.S. PATENT DOCUMENTS

| | | | |
|---|---|---|---|
| 3,455,609 | 7/1969 | Bratten | 137/38 X |
| 4,026,513 | 5/1977 | Callenberg | 251/61.1 |

Primary Examiner—Alan Cohan
Attorney, Agent, or Firm—Trevor B. Joike

[57] ABSTRACT

An apparatus is disclosed for adjusting an output pressure signal from a pneumatic device to a selected pressure for a given input pressure signal, the apparatus having a pneumatic device for receiving an input pressure signal and for providing an output pressure signal as a function of the input pressure signal, and a mounting apparatus for tiltably mounting the pneumatic device to a support to adjust the output pressure signal in response to selectively tilting the pneumatic device so that a given output pressure signal can be selected for a given input pressure signal.

21 Claims, 3 Drawing Figures

ADJUSTABLY TILTABLE PNEUMATIC DEVICE

BACKGROUND OF THE INVENTION

This invention relates to an adjustably tiltable pneumatic device and, more particularly, to a pneumatic device which can be tilted so that an output pressure can be adjustably selected for a given input pressure.

Pneumatic devices known in the prior art cover a wide range of functions such as amplification, high-low pressure selection, pressure diverting, comparison, addition, subtraction and other mathematical functions. Some of these devices require adjustment of a setpoint so that any output from the device will be a function of the difference between the input pressure to the device and the setpoint. Others, if not all, of these devices also require a calibration adjustment which typically involves a manually adjustable control for adjusting the output pressure until it is at a desired level for a given input pressure. That is, during the calibration operation, a predetermined input pressure is supplied to the device and the calibration adjustment mechanism is adjusted until the output pressure for that input pressure achieves a desired level.

The mechanisms by which the output pressure can be manually adjusted with respect to the input pressure for any selected function such as set point control or calibration has heretofore been performed by a spring arrangement after the device is mounted in a permanent position. According to this arrangement, the manually adjustable knob or lever operates against a spring which in turn operates against a pressure controlling element within the pneumatic device. A pneumatic input pressure is typically applied against this element opposite to the force applied by the adjustment spring.

The present invention eliminates these springs and, instead, adjusts the output pressure from the pneumatic device in response to the tilting of the device so that a given output pressure can be selected for a given input pressure. This arrangement eliminates unnecessary parts and reduces the spring rate of the pneumatic device.

SUMMARY OF THE INVENTION

Therefore, the present invention relates to an apparatus for adjusting an output pressure signal from a pneumatic device to a selected pressure for a given input pressure signal, the apparatus including a pneumatic device having an input for receiving an input pressure signal and an output for providing an output pressure signal as a function of the input pressure signal, and a mounting arrangement for tiltably mounting the pneumatic device to a support to adjust the output pressure signal in response to selective tilting of the pneumatic device so that a given output pressure signal can be selected for a given input pressure signal.

BRIEF DESCRIPTION OF THE DRAWINGS

These and other features and advantages will become apparent from a detailed consideration of the invention when taken in conjunction with the drawings in which.

DETAILED DESCRIPTION

Figure 1:
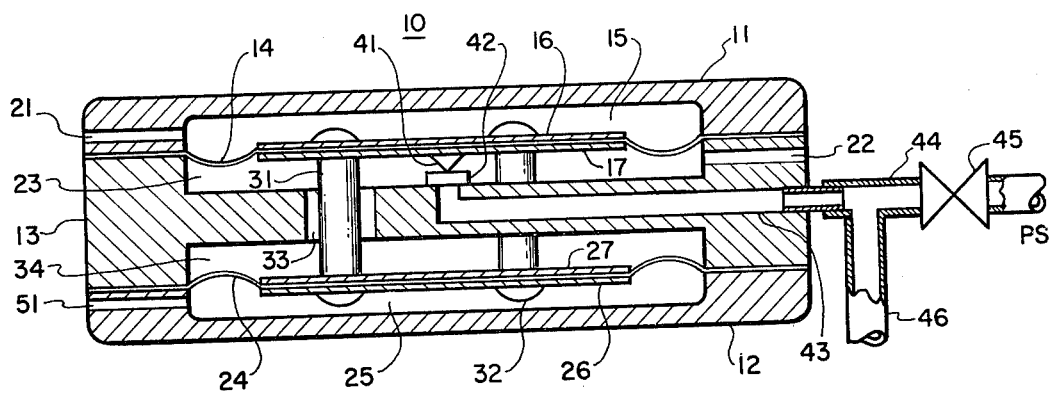
FIG. 1 is a cross-sectional view of one form of pneumatic device which can take advantage of the present invention.

The present invention may be useful on pneumatic devices such as pneumatic device 10 shown in FIG. 1. Device 10 comprises a housing having cover plate 11, cover plate 12 and intermediate plate 13. Diaphragm 14 is clamped between cover plate 11 and intermediate plate 13 for forming a first pressure chamber 15 between cover plate 11 and diaphragm 14. Attached to diaphragm 14 are suitable diaphragm plates 16 and 17.

Cover plate 11 has an aperture 21 extending therethrough for connecting an input pressure signal to chamber 15. Intermediate plate 13 has an aperture 22 extending therethrough for connecting the interior chamber 23 between diaphragm 14 and intermediate plate 13 to a reference pressure such as atmosphere. Diaphragm 24 is clamped between cover plate 12 and intermediate plate 13 for forming a second inlet pressure chamber 25 between diaphragm 24 and cover plate 12. Diaphragm 24 has diaphragm plates 26 and 27 suitably clamped thereto. Plates 16, 17, 26 and 27 are rigidly attached to one another by spacers 31 and 32 which are inserted through suitable apertures, such as aperture 33, of the intermediate plate 13. Spacers 31 and 32 assure that the pressures within chambers 15 and 25 will operate against one another. An interior chamber 34 is formed between diaphragm 24 and intermediate plate 13 and the interior chambers 23 and 34 are interconnected by way of the apertures, such as aperture 33, through which spacers 31 and 32 extend. Thus, like interior chamber 23, interior chamber 34 is also connected to the reference pressure by way of aperture 22.

Attached to plates 16 and 17 is a cone shaped flapper 41 which operates within a recessed cone shaped nozzle 42 which is connected to an aperture 43 extending from nozzle 42 through intermediate plate 13 for connection to input line 44. Input line 44 is connected to a main source of pressure Ps through restriction 45. Output line 46 is connected to line 44 between restriction 45 and aperture 43.

As the assembly comprising plates 16, 17, 26, 27 and spacers 31 and 32 move in response to the differential pressure within chambers 15 and 25, flapper cone 41 moves with respect to recessed cone shaped nozzle 42 for controlling the amount of bleed through chamber 23 to atmosphere through aperture 22 and, thus, the pressure in branch line 46. Flapper 41 may be designed for providing force feedback to the assembly 16-17-26-27-31-32.

The pneumatic device 10 is designed to control the output pressure in branch line 46 in accordance with the difference between the pressures in chamber 15 and 25. For example, pneumatic device 10 may be used for determining the velocity pressure of the air moving through a duct in an air conditioning system. In such a system, it is typical to provide a pitot tube arrangement having a total pressure sensing nozzle pointing into the air flow moving through the duct and a static pressure sensing nozzle pointed at right angles to the air moving through the duct. The total pressure of the air moving through the duct is comprised of both the velocity pressure and the static pressure of the air moving through the duct. Thus, to derive the velocity pressure, the static pressure must be subtracted from the total pressure. The total pressure pickup tube may be connected to aperture 21 and the static pressure tube may be connected to aperture 51 extending through cover plate 12 into chamber 25. Since the pressures in chambers 15 and 25 are operating against one another, they subtract. Thus, apparatus 16-17-26-27-31-32 moves in response to this difference, i.e. velocity pressure. As a result, the pressure in nozzle 42, and thus the pressures in aperture 43 and branch line 46, depend upon velocity pressure.

Figure 2:
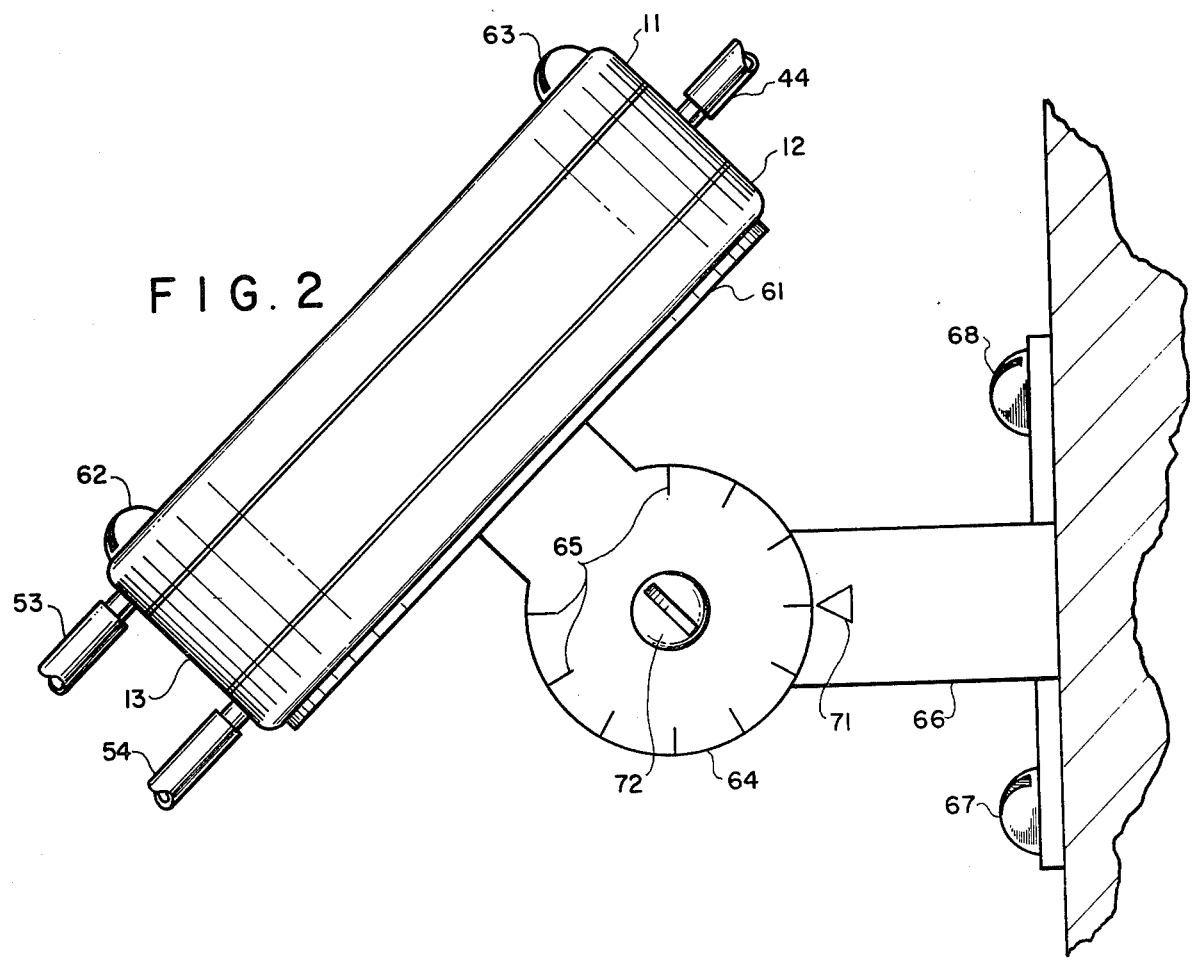
FIG. 2 shows the mounting arrangement according to the present invention for a pneumatic device; and, FIG. 3 shows a cross-sectional view of the mounting arrangement shown in FIG. 2.

FIG. 2 shows the tiltable mounting apparatus for tilting the pneumatic device in order to select a specific output pressure signal for a given input pressure signal. In the system shown in FIGS. 1 and 2, the input pressure signal is provided by two pressure inputs but, it must be understood, the input pressure signal can be provided by one or any number of pressure inputs. Similarly, the output pressure signal need not necessarily be provided by a single output pressure.

Figure 3:
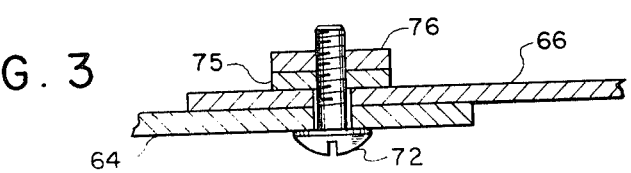

As shown in FIGS. 2 and 3, the cover plates 11 and 12 and the intermediate plate 13 are all secured together and to mounting plate 61 by suitable fastening means such as screws 62 and 63. Mounting plate 61 has formed integrally therewith a graduated rotatable mounting bracket 64 which has scale graduations 65 provided thereon. Graduated bracket 64 is adjustably secured to support bracket 66 which may be mounted to a wall or other support by suitable fastening means such as screws 67 and 68. Support bracket 66 has an arrow 71 located thereon for cooperating with graduations 65 to indicate a specific setpoint, calibration point or other indication for helping to select the output pressure in line 44 dependent upon the specific input pressure signal as, in the case of the device shown in FIGS. 1-3, is provided by the pressures in input lines 53 and 54. Graduated mounting bracket 64 may be secured to support bracket 66 by any suitable means such as a screw 72 inserted through corresponding holes in brackets 64 and 66 and secured by locking washer 75 and nut 76 for securing brackets 64 and 66 together once the setpoint has been adjusted or the device has been calibrated or the output pressure has otherwise been adjusted as a function of the input pressure signal.

Thus, since the output pressure signal in line 44 is affected by the spatial orientation of pneumatic device 10, pneumatic device 10 may be adjusted for setpoint or calibration by rotating graduated bracket 64 with respect to support bracket 66 and arrow 71 thereon until the output pressure in line 44 has attained a desired value with respect to a given input pressure signal. Specifically, known pressures are applied to lines 53 and 54 of pneumatic device 10 and pneumatic device 10 is tilted by using brackets 64 and 66 and screw 72 until the desired output pressure is attained in line 44.

The embodiments of the invention in which an exclusive property or right is claimed are defined as follows:

1. An apparatus for adjusting an output pressure signal of a pneumatic device to a selected pressure for a given input pressure signal comprising:
   a pneumatic device having input means for receiving an input pressure signal and an output means for providing an output pressure signal as a function of said input pressure signal; and,
   mounting means for tiltably mounting said pneumatic device to a support to adjust said output pressure signal in response to selective tilting of said pneumatic device so that a given output pressure signal can be selected for a given input pressure signal.

2. The apparatus of claim 1 wherein said mounting means comprises a first bracket attached to said pneumatic device, a second bracket for attachment to said support, and fastening means for adjustably attaching said first and second brackets together.

3. The apparatus of claim 2 wherein one of said first and second brackets has graduated indicating marks thereon and the other of said brackets has an indicating pointer thereon.

4. The apparatus of claim 3 wherein said pneumatic device comprises a first pressure chamber for receiving a first input pressure, a second pressure chamber for receiving a second input pressure, said first and second input pressures forming said input pressure signal, and a nozzle arrangement having a flapper operable in response to the pressures in said first and second pressure chambers and for providing an output pressure signal as a function of said first and second input pressures.

5. The apparatus of claim 4 wherein said pneumatic device comprises first and second cover plates, first and second diaphragms and an intermediate plate, said first diaphragm positioned between said first cover plate and said intermediate plate for forming said first pressure chamber between said cover plate and said first diaphragm, said second diaphragm being positioned between said second cover plate and said intermediate plate for forming said second pressure chamber between said second cover plate and said second diaphragm, said first and second diaphragms being interconnected by spacers extending through said intermediate plate, a flapper associated with one of said first and second diaphragms for cooperating with a nozzle in said intermediate plate, said output means comprising an aperture extending through said intermediate plate and connecting to said nozzle.

6. The apparatus of claim 1 wherein said pneumatic device comprises a first pressure chamber for receiving a first input pressure, a second pressure chamber for receiving a second input pressure, said first and second input pressures forming said input pressure signal, and a nozzle arrangement having a flapper operable in response to the pressures in said first and second pressure chambers and for providing an output pressure signal as a function of said first and second input pressures.

7. The apparatus of claim 6 wherein said pneumatic device comprises first and second cover plates, first and second diaphragms and an intermediate plate, said first diaphragm positioned between said first cover plate and said intermediate plate for forming said first pressure chamber between said cover plate and said first diaphragm, said second diaphragm being positioned between said second cover plate and said intermediate plate for forming said second pressure chamber between said second cover plate and said second diaphragm, said first and second diaphragms being interconnected by spacers extending through said intermediate plate, a flapper associated with one of said first and second diaphragms for cooperating with a nozzle in said intermediate plate, said output means comprising an aperture extending through said intermediate plate and connecting to said nozzle.

8. An apparatus for calibrating an output pressure signal of a pneumatic device to a selected pressure for a given input pressure signal comprising:
   a pneumatic device having input means for receiving an input pressure signal and an output means for providing an output pressure signal as a function of said input pressure signal; and,
   mounting means for tiltably mounting said pneumatic device to a support to calibrate said output pressure signal in response to selective tilting of said pneumatic device so that a given output pressure signal can be selected for a given input pressure signal.

9. The apparatus of claim 8 wherein said mounting means comprises a first bracket attached to said pneumatic device, a second bracket for attachment to said support, and fastening means for adjustably attaching said first and second brackets together.

10. The apparatus of claim 9 wherein one of said first and second brackets has graduated indicating marks thereon and the other of said brackets has an indicating pointer thereon.

11. The apparatus of claim 10 wherein said pneumatic device comprises a first pressure chamber for receiving a first input pressure, a second pressure chamber for receiving a second input pressure, said first and second input pressures forming said input pressure signal, and a nozzle arrangement having a flapper operable in response to the pressures in said first and second pressure chambers and for providing an output pressure signal as a function of said first and second input pressures.

12. The apparatus of claim 11 wherein said pneumatic device comprises first and second cover plates, first and second diaphragms and an intermediate plate, said first diaphragm positioned between said first cover plate and said intermediate plate for forming said first pressure chamber between said cover plate and said first diaphragm, said second diaphragm being positioned between said second cover plate and said intermediate plate for forming said second pressure chamber between said second cover plate and said second diaphragm, said first and second diaphragms being interconnected by spacers extending through said intermediate plate, a flapper associated with one of said first and second diaphragms for cooperating with a nozzle in said intermediate plate, said output means comprising an aperture extending through said intermediate plate and connecting to said nozzle.

13. The apparatus of claim 9 wherein said pneumatic device comprises a first pressure chamber for receiving a first input pressure, a second pressure chamber for receiving a second input pressure, said first and second input pressures forming said input pressure signal, and a nozzle arrangement having a flapper operable in response to the pressures in said first and second pressure chambers and for providing an output pressure signal as a function of said first and second input pressures.

14. The apparatus of claim 13 wherein said pneumatic device comprises first and second cover plates, first and second diaphragms and an intermediate plate, said first diaphragm positioned between said first cover plate and said intermediate plate for forming said first pressure chamber between said cover plate and said first diaphragm, said second diaphragm being positioned between said second cover plate and said intermediate plate for forming said second pressure chamber between said second cover plate and said second diaphragm, said first and second diaphragms being interconnected by spacers extending through said intermediate plate, a flapper associated with one of said first and second diaphragms for cooperating with a nozzle in said intermediate plate, said output means comprising an aperture extending through said intermediate plate and connecting to said nozzle.

15. An apparatus for adjusting the setpoint of a pneumatic device comprising:
a pneumatic device having input means for receiving an input pressure signal and an output means for providing an output pressure signal as a function of said input pressure signal; and,
mounting means for tiltably mounting said pneumatic device to a support for adjusting said setpoint by selectively tilting said pneumatic device.

16. The apparatus of claim 15 wherein said mounting means comprises a first bracket attached to said pneumatic device, a second bracket for attachment to said support, and fastening means for adjustably attaching said first and second brackets together.

17. The apparatus of claim 16 wherein one of said first and second brackets has graduated indicating marks thereon and the other of said brackets has an indicating pointer thereon.

18. The apparatus of claim 17 wherein said pneumatic device comprises a first pressure chamber for receiving a first input pressure, a second pressure chamber for receiving a second input pressure, said first and second input pressures forming said input pressure signal, and a nozzle arrangement having a flapper operable in response to the pressures in said first and second pressure chambers and for providing an output pressure signal as a function of said first and second input pressures.

19. The apparatus of claim 18 wherein said pneumatic device comprises first and second cover plates, first and second diaphragms and an intermediate plate, said first diaphragm positioned between said first cover plate and said intermediate plate for forming said first pressure chamber between said cover plate and said first diaphragm, said second diaphragm being positioned between said second cover plate and said intermediate plate for forming said second pressure chamber between said second cover plate and said second diaphragm, said first and second diaphragms being interconnected by spacers extending through said intermediate plate, a flapper associated with one of said first and second diaphragms for cooperating with a nozzle in said intermediate plate, said output means comprising an aperture extending through said intermediate plate and connecting to said nozzle.

20. The apparatus of claim 15 wherein said pneumatic device comprises a first pressure chamber for receiving a first input pressure, a second pressure chamber for receiving a second input pressure, said first and second input pressures forming said input pressure signal, and a nozzle arrangement having a flapper operable in response to the pressures in said first and second pressure chambers and for providing an output pressure signal as a function of said first and second input pressures.

21. The apparatus of claim 20 wherein said pneumatic device comprises first and second cover plates, first and second diaphragms and an intermediate plate, said first diaphragm positioned between said first cover plate and said intermediate plate for forming said first pressure chamber between said cover plate and said first diaphragm, said second diaphragm being positioned between said second cover plate and said intermediate plate for forming said second pressure chamber between said second cover plate and said second diaphragm, said first and second diaphragms being interconnected by spacers extending through said intermediate plate, a flapper associated with one of said first and second diaphragms for cooperating with a nozzle in said intermediate plate, said output means comprising an aperture extending through said intermediate plate and connecting to said nozzle.

* * * * *